(12) United States Patent
Li et al.

(10) Patent No.: US 10,114,655 B2
(45) Date of Patent: Oct. 30, 2018

(54) RAPID START UP METHOD FOR ELECTRONIC EQUIPMENT

(71) Applicant: Amlogic (Shanghai), Inc., Shanghai (CN)

(72) Inventors: Zhenfei Li, Shanghai (CN); Xiaoqun Chen, Shanghai (CN); Furao Zhong, Shanghai (CN)

(73) Assignee: Amlogic (Shanghai) Co., Ltd., Shanghai (CN)

( * ) Notice: Subject to any disclaimer, the term of this patent is extended or adjusted under 35 U.S.C. 154(b) by 42 days.

(21) Appl. No.: 15/282,106

(22) Filed: Sep. 30, 2016

(65) Prior Publication Data

US 2017/0039075 A1   Feb. 9, 2017

(30) Foreign Application Priority Data

Aug. 4, 2015   (CN) .......................... 2015 1 0471929

(51) Int. Cl.
| | | |
|---|---|---|
| *G06F 9/44* | (2018.01) | |
| *G06F 9/4401* | (2018.01) | |
| *G06F 21/64* | (2013.01) | |
| *G06F 8/65* | (2018.01) | |

(52) U.S. Cl.
CPC .............. *G06F 9/4406* (2013.01); *G06F 8/65* (2013.01); *G06F 21/64* (2013.01)

(58) Field of Classification Search
CPC ...... G06F 8/665; G06F 9/4401; G06F 9/4406; G06F 21/64
See application file for complete search history.

(56) References Cited

U.S. PATENT DOCUMENTS

| | | | |
|---|---|---|---|
| 2006/0282654 A1* | 12/2006 | Veen ...................... | G06F 9/4418 713/1 |
| 2007/0083743 A1* | 4/2007 | Tsang .................... | G06F 9/4418 713/1 |
| 2014/0129820 A1* | 5/2014 | Lim ...................... | G06F 9/4401 713/2 |

* cited by examiner

*Primary Examiner* — Albert Wang
(74) *Attorney, Agent, or Firm* — The Dobrusin Law Firm, PC

(57) ABSTRACT

The present invention relates to the field of electronic equipment, more particularly, to a rapid start up method for the electronic equipment, by using generating and storing the memory image in the non-volatile memory of the electronic equipment and calling the memory image to operate with recovery of the memory data and device status, complete the electronic equipment reboot, i.e., when the Android-based electronic equipment reboot, there is no need to start Kernel according to the normal start up mode firstly and call service manager and services in turn and use Zygote to create operating environment, so as to complete reboot, and then improve start up speed and user experience.

10 Claims, 2 Drawing Sheets

When a normal start-up operation of the electronic equipment is completed, generating a memory image according to the memory data of the electronic equipment and the running state data of the related devices during the operation of the current electronic equipment storing the memory image in the nonvolatile memory of the electronic equipment When a normal start-up operation of the electronic equipment is completed, generating a memory image according to the memory data of the electronic equipment and the running state data of the related devices during the operation of the current electronic equipment storing the memory image in the nonvolatile memory of the electronic equipment

RAPID START UP METHOD FOR ELECTRONIC EQUIPMENT

CROSS-REFERENCE TO RELATED APPLICATIONS

The present application claims priority to and the benefit of Chinese Patent Application No. CN 201510471929.7, filed on Aug. 4, 2015, the entire content of which is incorporated herein by reference.

BACKGROUND OF THE INVENTION

1. Field of the Invention

The present invention relates to the field of electronic equipment, more particularly, to a rapid start up method for an electronic equipment.

2. Description of the Related Art

Nowadays, when the Android-based electronic equipment restarts, all start with Kernel firstly, and call the service manager and many services, and only when the operating environment is created based on Zygote, system server and other Init work can be started; after the above actions, the Android-based electronic equipment can display an interface which user can operate normally, i.e. when the Android-based electronic equipment restarts, it spends so much time to operate these steps that cause a poor user experience.

In addition, with the increasing of Installed Android Applications in the electronic equipment, the time spent on booting becomes longer, and it further reduces the user experience.

SUMMARY OF THE INVENTION

Aimed at the above-mentioned problems existing in the prior art, this invention provides a rapid start-up method for an electronic equipment, the method can be applied to restart the Android-based electronic equipment. The electronic equipment comprises a first storage device connected to the CPU in communication way, and the first storage device stores memory image; the method comprises:

the CPU calling the memory image saved in the first storage device and restarting the electronic equipment according to the memory image.

As a preferred embodiment, for the rapid start up method for the electronic equipment, wherein, the electronic equipment further comprises a memory, and the memory is connected with the CPU and the first storage device respectively in communication way, the method further comprising:

generating the memory image after the processing of the memory data in the memory and running state data of the related device in the electronic equipment when a normal start-up of the electronic equipment is completed, storing the memory image in the first storage device.

As a preferred embodiment, for the rapid start up method for the electronic equipment, wherein, the memory image is generated when the electronic equipment starts up at the first time after firmware upgraded and/or when the electronic equipment starts up at the first time after factory resetting; and if it is found that no memory image matching the memory stores in the first storage device during the electronic equipment restarting, generate the memory image when the electronic equipment first normal restarting in a common way.

As a preferred embodiment, for the rapid start up method for the electronic equipment wherein, detecting whether the memory image saved in the first storage device is corrupted, by CRC checking method, if it is found that the memory image saved in the first storage device is corrupted during the electronic equipment restarting, generate the memory image when the electronic equipment first normal restarting in a common way.

As a preferred embodiment, for the rapid start up method for the electronic equipment, wherein the newly generated memory image replaces the memory image saved in the first storage device, so as to ensure the first storage device only stores the latest memory image.

As a preferred embodiment, for the rapid start up method for the electronic equipment, wherein the memory image is generated after compiling, shrinking and compressing the memory data in the memory and the running state data of the related device in the electronic equipment in turn.

As a preferred embodiment, for the rapid start up method for the electronic equipment wherein, according to the memory image, the CPU recover the data of the memory and the running state of the related device respectively, so as to restart the electronic equipment.

As a preferred embodiment, for the rapid start up method for the electronic equipment wherein, the electronic equipment further comprises a second storage device connected to the CPU, and the second storage device stores the recordable data of the electronic equipment, the method further comprising:

the CPU calling the recordable data, and according to the recordable data, the CPU updating the recordable data of the running electronic equipment during the electronic equipment restarting.

As a preferred embodiment, for the rapid start up method for the electronic equipment wherein, the second storage device is a non-volatile memory.

As a preferred embodiment, for the rapid start up method for the electronic equipment wherein the first storage device is a non-volatile memory.

As a preferred embodiment, for the rapid start up method for the electronic equipment wherein, the CPU calls the memory image saved in the first storage device, and compresses the memory image, thereafter reboots the electronic equipment according to the compressed memory image.

As a preferred embodiment, for the rapid start up method for the electronic equipment wherein, the storage module stores the memory image, the CPU calls the memory image saved in the first storage device, and according to the memory image, the CPU restarts the electronic equipment.

The above technical scheme has the following advantages or beneficial effects:

The technical scheme of the invention uses the generated and stored memory image in the non-volatile memory of the electronic equipment, and, when the electronic equipment restarting, directly calling the memory image to operate with recovery of the memory data, and the device status and so on, to complete the restart of the electronic equipment reboot, i.e., when the Android-based electronic equipment restarts, there is no need to follow the normal start-up mode to start with Kernel according to the normal start up mode firstly, and call service manager and services in turn and use Zygote to create operating environment, so as to start the process and many other initial operations and a series of actions to complete restarting; and then so that it can improve start-up speed and user experience.

BRIEF DESCRIPTIONS OF THE DRAWINGS

The accompanying drawings, together with the specification, illustrate exemplary embodiments of the present disclosure, and, together with the description, serve to explain the principles of the present invention.

DETAILED DESCRIPTION

Figure 1:
FIG. 1 is a flow diagram of the electronic equipment of the invention generating the memory image.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "plurality" means a number greater than one.

Hereinafter, certain exemplary embodiments according to the present disclosure will be described with reference to the accompanying drawings.

A rapid start up method for an electronic equipment provided by the invention can be applied on the basis of Android-based electronic equipment (the method can also be applied to those equipment running other system; the Android-based electronic equipment is taken as an example to illustrate the method; the rapid start up method for the other system-based equipment is similar to the invention, not explained in detail here), according to the memory data, the device status information and other data when the electronic equipment starting normally, generating the memory image, and storing the memory image in the nonvolatile memory of the electronic equipment, for calling the memory directly when the electronic equipment restarting again, so as to make the electronic equipment rapidly restore to the state of generating the memory image (i.e. reloading system memory image into the DDR); and with the update of the recordable data, the electronic equipment is rapidly restored to the state of the equipment last switched-off.

The accompanying drawings, together with the specification, illustrate exemplary embodiment of the present disclosure, and, together with the description, serve to explain the principles of the present invention.

FIG. 1 is a flow diagram of generation of memory image by the electronic equipment of the invention. As shown in FIG. 1, in this embodiment, at the same time of completing normal start-up of the electronic equipment, a memory image (may also call it snapshot) can be generated according to the memory data of the electronic equipment and running state data of the related device included by the present electronic equipment when running, and the memory image is stored to the non-volatile storage (i.e. the first storage device) of the electronic equipment, for the follow-up rapid start-up of the electronic equipment.

For instance, when the electronic equipment normally starts up at the first time after firmware upgrading and/or when the electronic equipment normally starts up at the first time after factory resetting, at the time of the normal start-up is about to complete or completed, a memory image data can be generated according to the data (i.e. Memory data) operated in the DRAM and running state data of the related devices required by the operation of the electronic equipment (i.e. the related devices required for normal start-up of the electronic equipment).

Thereafter, after compiling, shrinking and compressing the memory image data, the memory image data is transferred and stored to the non-volatile storage of the electronic equipment (such as disk); after a series of operations mentioned above, the size of the memory image data is effectively reduced, and the smaller memory image data not only shortens the load time of the electronic equipment restart, but also decreases the storage space of the memory image data; for instance, an original generated memory image data of 120M-250M is only 35M-75M after being compressed; the compression rate can be up to 29%, so as to reduce the restart time and storage space occupied in the electronic equipment.

Preferably, while compressing the memory image data, CRC (Cyclic Redundancy Check) can also be added for coding, and facilitates the later CRC check operation to the memory image data, so as to judge whether the memory image data is corrupted.

Further, when the electronic equipment starts up or restarts later, if it is found that no memory image data is saved in the electronic equipment, or the saved memory image data is corrupted, or the memory image data does not match the memory, the electronic equipment can start with the traditional start method (see the relevant description in the background section); and when a normal start-up is about to complete or completed, a memory image data is generated according to the data operated in the memory of the electronic equipment and running state data of the related device required by the operating electronic equipment (please referring the above specific memory image generating steps, not explained in detail here), and the memory image data can be transferred and stored to the non-volatile memory of the electronic equipment.

Preferably, when the memory image data (i.e. a new image data) is being transferred and stored in the non-volatile memory of the electronic equipment, if a memory image data (i.e. an old memory image data) is already saved in the non-volatile memory, no matter whether the old memory image data is corrupted or matching the memory, delete the old memory image data and only store the new memory image data, i.e. the memory image data saved in the non-volatile memory is unique and latest generated.

It should be noted that, the above mentioned memory image data is not burnt into the device of the electronic equipment, but generated by itself when the electronic equipment starts up normally.

Figure 2:
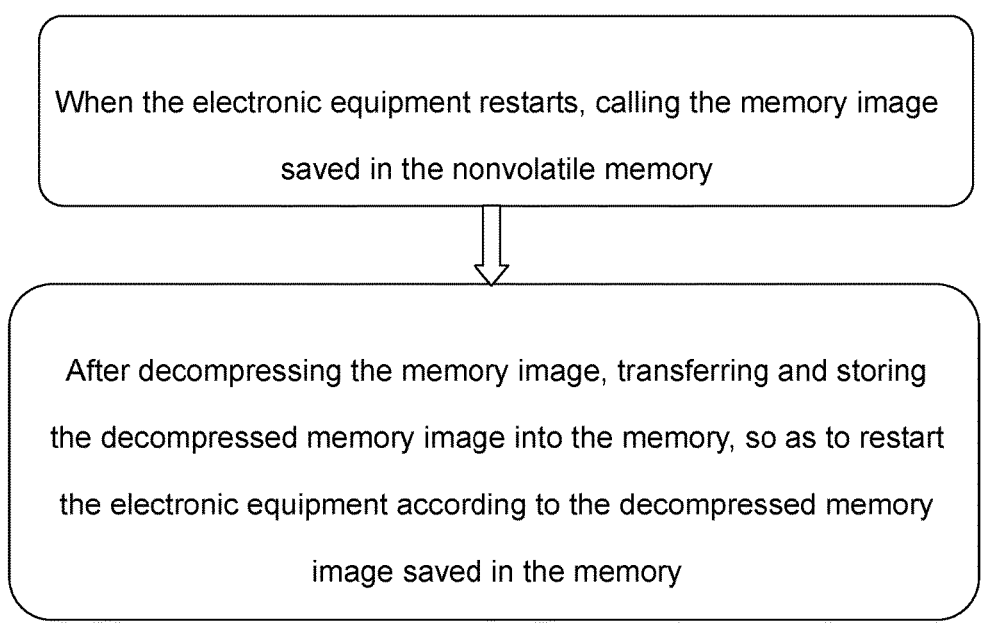
FIG. 2 is a flow diagram of rapid start-up of the electronic equipment by using the memory image of the invention.

FIG. 2 is a flow diagram of a rapid start-up of the electronic equipment using the memory image of the invention; as shown in FIG. 2, the rapid start up method for the electronic equipment further comprising:

Step S1: when the electronic equipment starting up, firstly judging whether a memory image is saved in the non-volatile memory used for saving memory image, If the above mentioned non-volatile memory stores no memory image, continue to Step S2, Otherwise, continue to Step S3.

Step S2: starting up the electronic equipment with the common start-up method, and when the normal start-up is about to complete or completed, according to the previous steps of generating memory image, generating and storing the memory image into the non-volatile memory, for subsequent operations of rapid start-up of the electronic equipment.

Step S3: judge whether the memory image saved in the non-volatile memory is corrupted (such as with the method of CRC) and whether the memory image matches the memory of the electronic equipment, If the memory is corrupted or does not match the memory of the electronic equipment, continue to Step S2 (mainly because the generated image does not contain the kernel text section data at all, so only if the memory image match the memory perfectly, the equipment restart can be processed), Otherwise, continue to Step S4, Step S4: the electronic equipment loading the memory image (i.e. currently, the memory image saved in the non-volatile memory (such as Disk) is not only uncorrupted, but also matches the system of the electronic equipment executing the start-up task), and processing the memory image (such as when the memory image saved in the Disk is compressed image, firstly the memory image needs to be decompressed), and using the decompressed memory image to restore the restarting of the memory (such as DDR) of the electronic equipment, so as to rapidly start up the electronic equipment.

Further, the above Step S4 of using the decompressed memory image to restore the restarting of the memory of the electronic equipment is mainly used for recovering device, refreshing database and so on; and specifically, including memory data restoring, device recovering, database refresh and so on, i.e. after the memory data and the device status restored, the system of the electronic equipment is made to restore to the state when making the memory image (i.e. the state when startup is completed).

Further, the electronic equipment is provided with a second storage device (maybe a nonvolatile memory), configured to store all recordable data when the electronic equipment running, and the second storage device and the above mentioned first storage device may be different storage space structure in the same memory device, i.e. the above mentioned memory image and the recordable data can be saved in the different storage space structure of the same memory; when the electronic equipment restarting, after Step S4, the recordable data saved in the second storage device can be called, so as to update the running state of the related device of the electronic equipment and the parameter; for instance, when the electronic equipment generates the above mentioned memory image, the display resolution of the electronic equipment is 720p, and in the following process, switch the display resolution to 1080p, and the corresponding electronic equipment records and stores these recordable data in real time; in the subsequent restarting of the electronic equipment, once the electronic equipment starts, call the recordable data to make the display resolution 1080p, which increases user experience.

It should be noted that, the electronic equipment comprises: a CPU, and the above mentioned memory, the first storage device, the second storage device which are all connected to the CPU in communication way; and the memory can directly call the data saved in the first storage device and the second storage device, and also the memory can transfer and save the data saved therein to the first storage device and the second storage device; the above mentioned generating, storing, and calling of the memory image and the recordable data are all controlled by the CPU, so as to complete the generation of the memory image, the restart of the electronic equipment and so on; since it is based on the current conventional operation means of electronic equipment, it will not be detailed, but the persons skilled in the art will understand that it cannot be used on restriction on this application.

Specifically, when the electronic equipment starts up, firstly judge whether the storage device saves the memory image matching the memory; if no memory image matching the memory is stored, generate the memory image according to the normal start-up and store the image for later calling the image for subsequent start-up directly; if it is found that the storage stores the memory image matching the memory, directly call the memory image to recovering the state of the memory and the related device of the electronic equipment, so as to make the electronic equipment quickly restore to the state of making the memory image; meanwhile, update the running state of the related device to running state of latest switch-off by calling the recordable data saved in the electronic equipment, which increases the user experience.

In summary, the embodiment of the invention provides for a rapid start-up method of method for the electronic equipment: directly restart through using the mirror data memory image data generated at normal start-up for directly reboot, i.e., by saving the memory and the running state of the electronic equipment at a time of normal start-up, at next start up, directly restore the memory and the running state through the saved data in next start-up; comparing to the traditional start-up method for the electronic equipment, this method of restoring the running state directly by software is more quickly, and the time spent in the generation of the memory image and restart is unaffected by the APK installed in the electronic equipment.

The foregoing is only the preferred embodiments of the invention, not thus limiting embodiments and scope of the invention, those skilled in the art should be able to realize that the schemes obtained from the content of specification and figures of the invention are within the scope of the invention.

What is claimed is:

1. A rapid start-up method for an electronic equipment comprising:
providing the electronic equipment comprising:

i) a first storage device in communication with a central processing unit (CPU), wherein the first storage device stores a memory image; and
ii) ii) a memory in communication with the CPU and the first storage device;
generating the memory image after processing of memory data in the memory and running state data of a related device in the electronic equipment, when a normal start-up of the electronic equipment is finished;
storing the memory image in the first storage device;
calling the memory image saved in the first storage device by the CPU, and restarting the electronic equipment according to the memory image;
detecting whether the memory image saved in the first storage device is corrupted by a CRC checking method;
wherein if the memory image saved in the first storage device is corrupted during the electronic image restarting, generating a newly generated memory image when the electronic equipment is restarted in a common way.

2. The method of claim 1, wherein:
the memory image is generated when the electronic equipment starts up at the first time after firmware upgrading and/or when the electronic equipment starts up at the first time after factory resetting; and
if it is found that no memory image matching the memory stores in the first storage device during the electronic equipment restarting, generating a newly generated memory image when the electronic equipment is first restarted in a common way.

3. The method of claim 1, wherein:
the newly generated memory image replaces the memory image saved in the first storage device, so as to ensure the first storage device only stores the latest memory image.

4. The method of claim 1, wherein, the method comprises:
generating the memory image, after compiling, shrinking and compressing the memory data in the memory and the running state data of the related device in the electronic equipment in turn.

5. The method of claim 1, wherein:
according to the memory image, the CPU recovers the data of the memory and the running state of the related device respectively, so as to restart the electronic equipment.

6. The method of claim 5, wherein the electronic equipment further comprises a second storage device connected to the CPU, and the second storage device stores the recordable data of the electronic equipment, the method further comprising:
calling the recordable data by the CPU, and according to the recordable data, the CPU updating the recordable data of the running equipment during the electronic equipment restarting.

7. The method of claim 6, wherein the second storage device is a non-volatile memory.

8. The method of claim 1, wherein the first storage device is a non-volatile memory.

9. The method of claim 1, wherein the CPU calls the memory image saved in the first storage device, and decompresses the memory image, thereafter restarts the electronic equipment according to the decompressed memory image.

10. The method of claim 1, wherein the first storage device stores the memory image, the CPU calls the memory image saved in the first storage device, and according to the memory image, the CPU restarts the electronic equipment.

* * * * *